(12) United States Patent
Williams (10) Patent No.: US 8,523,111 B2
(45) Date of Patent: Sep. 3, 2013

(54) METHOD OF STIFFENING A RIB

(75) Inventor: Stephen Williams, Newport (GB)

(73) Assignee: Airbus Operations Limited, Bristol (GB)

( * ) Notice: Subject to any disclaimer, the term of this patent is extended or adjusted under 35 U.S.C. 154(b) by 261 days.

(21) Appl. No.: 12/737,549

(22) PCT Filed: Jul. 20, 2009

(86) PCT No.: PCT/GB2009/050889
§ 371 (c)(1),
(2), (4) Date: Jan. 25, 2011

(87) PCT Pub. No.: WO2010/010382
PCT Pub. Date: Jan. 28, 2010

(65) Prior Publication Data
US 2011/0147522 A1     Jun. 23, 2011

(30) Foreign Application Priority Data
Jul. 25, 2008     (GB) .................................. 0813584.0

(51) Int. Cl.
*B64C 1/00*     (2006.01)
(52) U.S. Cl.
USPC .................................. 244/123.1; 244/123.12
(58) Field of Classification Search
USPC ............... 244/123.1, 123.12, 123.7, 131, 133
See application file for complete search history.

(56) References Cited

U.S. PATENT DOCUMENTS

| 3,669,807 | A | 6/1972 | Jarvis et al. |
| 5,249,785 | A | 10/1993 | Nelson et al. |
| 6,170,157 | B1 * | 1/2001 | Munk et al. .................. 29/897.2 |
| 6,173,925 | B1 * | 1/2001 | Mueller et al. ................ 244/219 |

(Continued)

FOREIGN PATENT DOCUMENTS

| GB | 2 417 228 | 2/2006 |
| WO | 97/34733 | 9/1997 |
| WO | 03/022677 | 3/2003 |

OTHER PUBLICATIONS

International Search Report for PCT/GB2009/050889, mailed Mar. 11, 2010.

(Continued)

*Primary Examiner* — Christopher P Ellis
(74) *Attorney, Agent, or Firm* — Nixon & Vanderhye P.C.

(57) ABSTRACT

A method of stiffening a rib (19, 20) during the assembly of an aircraft wing is described. A stiffener panel (40, 41) is attached to a face of the rib (19, 20). The rib is aligned with one or more wing components with the stiffener panel (40, 41) attached. An assembly operation such as drilling (16) is performed with the rib aligned and the stiffener panel attached. The stiffener panel (40, 41) is removed from the rib after the assembly operation. The stiffener panel has a resilient external sealing ring which is mounted on a face of the panel and forms an external perimeter of a vacuum cavity; and at least one resilient internal sealing ring which is mounted on the panel (20, 21) within the perimeter defined by the external sealing ring and forms an internal perimeter of the vacuum cavity. The stiffener can be attached to the rib by a vacuum clamping force, the vacuum being sealed by the external and internal sealing rings. The internal sealing ring(s) seal any holes which are present in the rib. The stiffener (40, 41) can support the rib (20, 21) during alignment to give it the required flatness.

16 Claims, 9 Drawing Sheets

(56) References Cited

U.S. PATENT DOCUMENTS

| | | | |
|---|---|---|---|
| 6,386,481 B1* | 5/2002 | Kallinen | 244/123.1 |
| 7,080,805 B2* | 7/2006 | Prichard et al. | 244/117 R |
| 7,198,691 B2* | 4/2007 | Ludin et al. | 156/293 |
| 7,398,586 B2* | 7/2008 | Prichard et al. | 29/448 |
| 7,861,969 B2* | 1/2011 | Guzman et al. | 244/120 |
| 8,156,711 B2* | 4/2012 | Hethcock et al. | 52/790.1 |
| 8,276,848 B2* | 10/2012 | Zuniga Sagredo | 244/123.8 |
| 2005/0116105 A1 | 6/2005 | Munk et al. | |
| 2010/0193636 A1* | 8/2010 | De Vita et al. | 244/123.1 |

OTHER PUBLICATIONS

Great Britain Search Report of 0813584.0, searched Nov. 20, 2008.

* cited by examiner

METHOD OF STIFFENING A RIB

This application is the U.S. national phase of International Application No. PCT/GB2009/050889 filed 20 Jul. 2009, which designated the U.S. and claims priority to Great Britain application no. 0813584.0, filed 25 Jul. 2008, the entire contents of each of which are hereby incorporated by reference.

FIELD OF THE INVENTION

The present invention relates to a method of stiffening a rib as it is aligned with one or more aircraft wing components in the formation of a wing assembly, and a stiffener suitable for use in such a method.

BACKGROUND OF THE INVENTION

An aircraft wing box is typically formed by upper and lower covers extending between front and rear spars and a series of ribs attached to the covers and spars. During assembly it is necessary to hold the rib flat as it is aligned with and attached to the covers and spars. However the rib may not have sufficient stiffness to support itself to maintain the required flatness during assembly.

SUMMARY OF THE INVENTION

A first aspect of the invention provides a method of stiffening a rib during the assembly of an aircraft wing. The method comprises: attaching one or more stiffener panels to a face of the rib; aligning the rib with a wing component (such as a cover and/or a spar) with the stiffener panel(s) attached; performing an assembly operation with the rib aligned and the stiffener panel(s) attached; and removing the stiffener panel(s) from the rib after the assembly operation.

The assembly operation may comprise fastening the rib to the wing component, for instance by passing fasteners such as bolts through the rib and the wing component. Alternatively the assembly operation may comprise drilling one or more fasteners holes in the rib and/or the wing component by passing a drill through the aligned rib and wing component. In this case the fasteners may be inserted into the holes with or without the stiffener panel(s) in place.

Typically the rib comprises a rib web with a series of rib feet positioned at an edge of the rib web and extending at an angle to the rib web. The rib feet can then be used to attach the rib to the component(s). The use of a relatively broad and thin stiffener panel enables the rib feet to be accessible for drilling or fastening operations. Typically the rib feet have distal ends remote from the rib web which are spaced from the rib web by a distance D measured in a direction normal to the rib web, and the stiffener panel has a maximum thickness measured in a direction normal to the rib web which is less than D.

The stiffener panel(s) may be attached to the rib by mechanical fasteners, or by the action of a partial vacuum. Where a partial vacuum is used then preferably each stiffener panel comprises a resilient external sealing ring which is mounted on a face of the panel and forms an external perimeter of a vacuum cavity; and at least one resilient internal sealing ring which is mounted on the panel within the perimeter defined by the external sealing ring and forms an internal perimeter of the vacuum cavity. In this case the stiffener panel is attached to the rib by forming a vacuum chamber by engaging the rib with the external sealing ring of the stiffener panel, the rib having one or more holes located within the perimeter defined by the external sealing ring; sealing each hole in the rib with a respective internal sealing ring; and creating a partial vacuum in the vacuum chamber to attach the stiffener panel to the rib.

Typically the stiffener panel(s) cover more than 50% of the area of the face of the rib, and preferably more than 80%.

A further aspect of the invention provides an aircraft wing rib assembly comprising: a wing rib; and one or more stiffener panels attached to a face of the wing rib.

A further aspect of the invention provides a stiffener comprising: a panel; and a resilient external sealing ring which is mounted on a face of the panel and forms an external perimeter of a vacuum cavity. This aspect of the invention provides a stiffener which can be attached to the rib by a vacuum clamping force, the vacuum being sealed by the external sealing ring.

Preferably the stiffener has at least one resilient internal sealing ring which is mounted on the panel within the perimeter defined by the external sealing ring and forms an internal perimeter of the vacuum cavity. The internal sealing ring(s) can then seal any holes which are present in the rib.

Typically the stiffener is formed substantially from a composite material. Preferably the composite material is a fibre-reinforced composite. This enables the direction of the fibres to be tailored to stiffen the panel in a desired direction.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
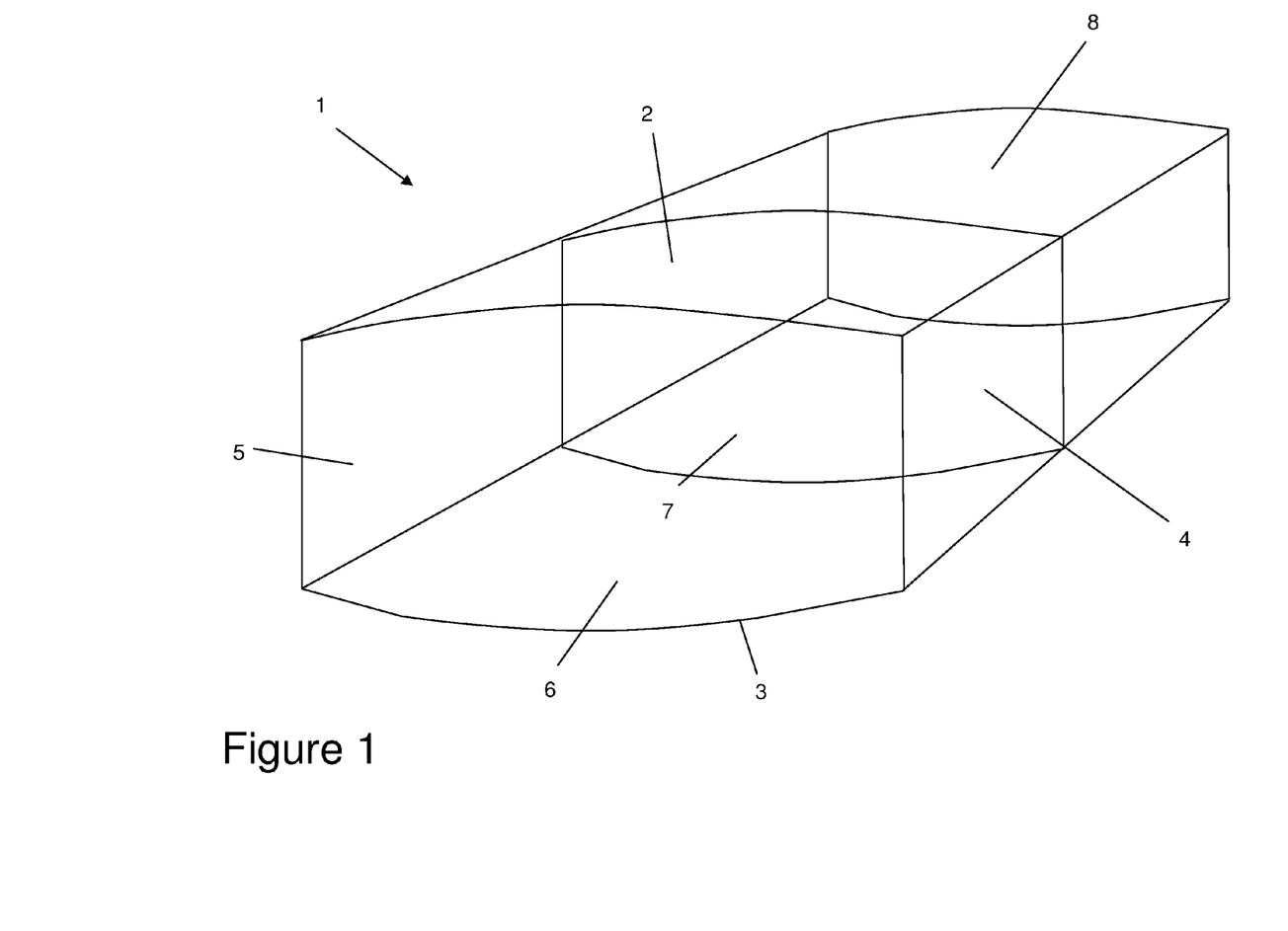
FIG. 1 is a schematic perspective view of a wing box of an aircraft wing.
Figure 2:
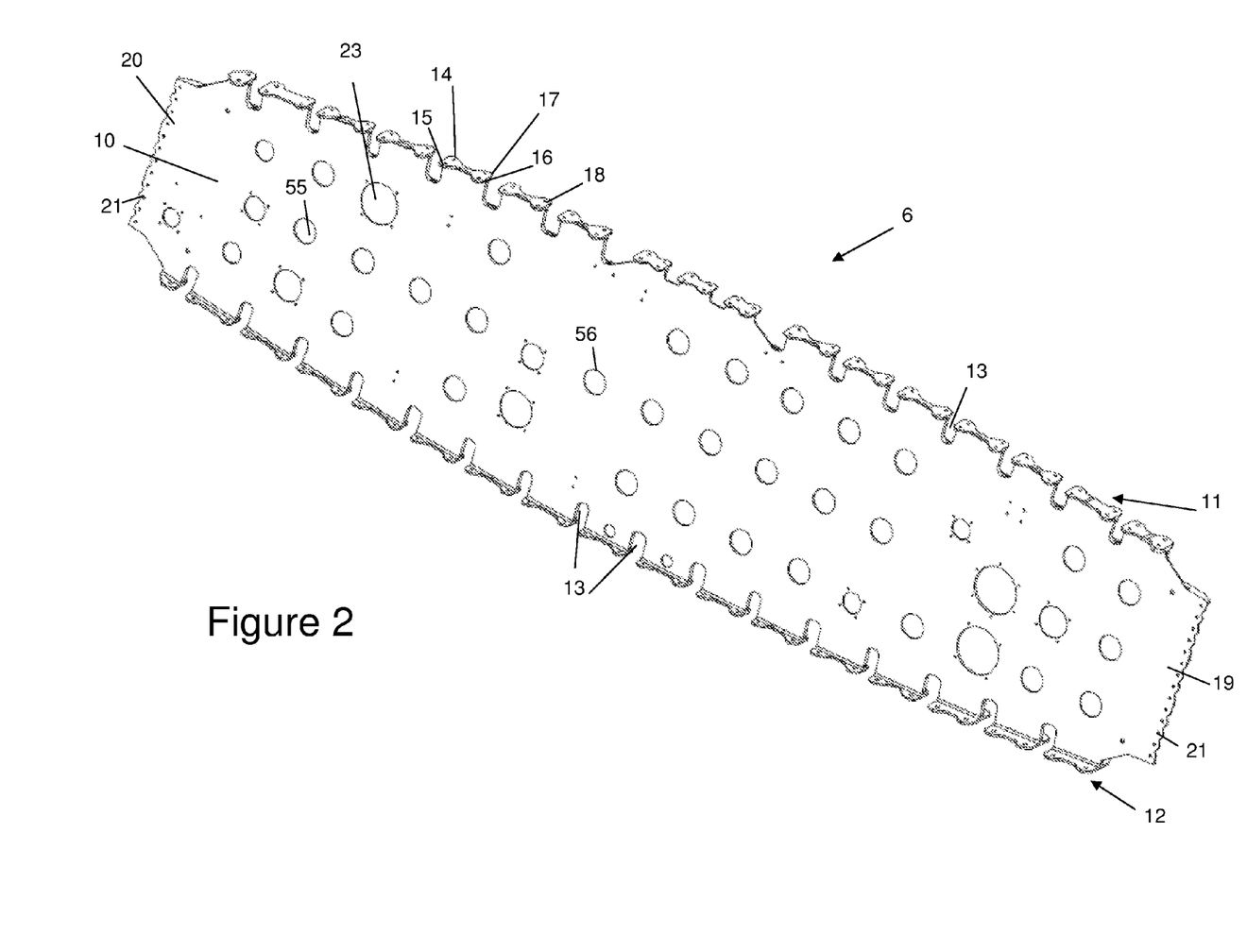
FIGS. 2 and 3 are perspective views of opposite faces of one of the ribs shown in FIG. 1.
Figure 3:
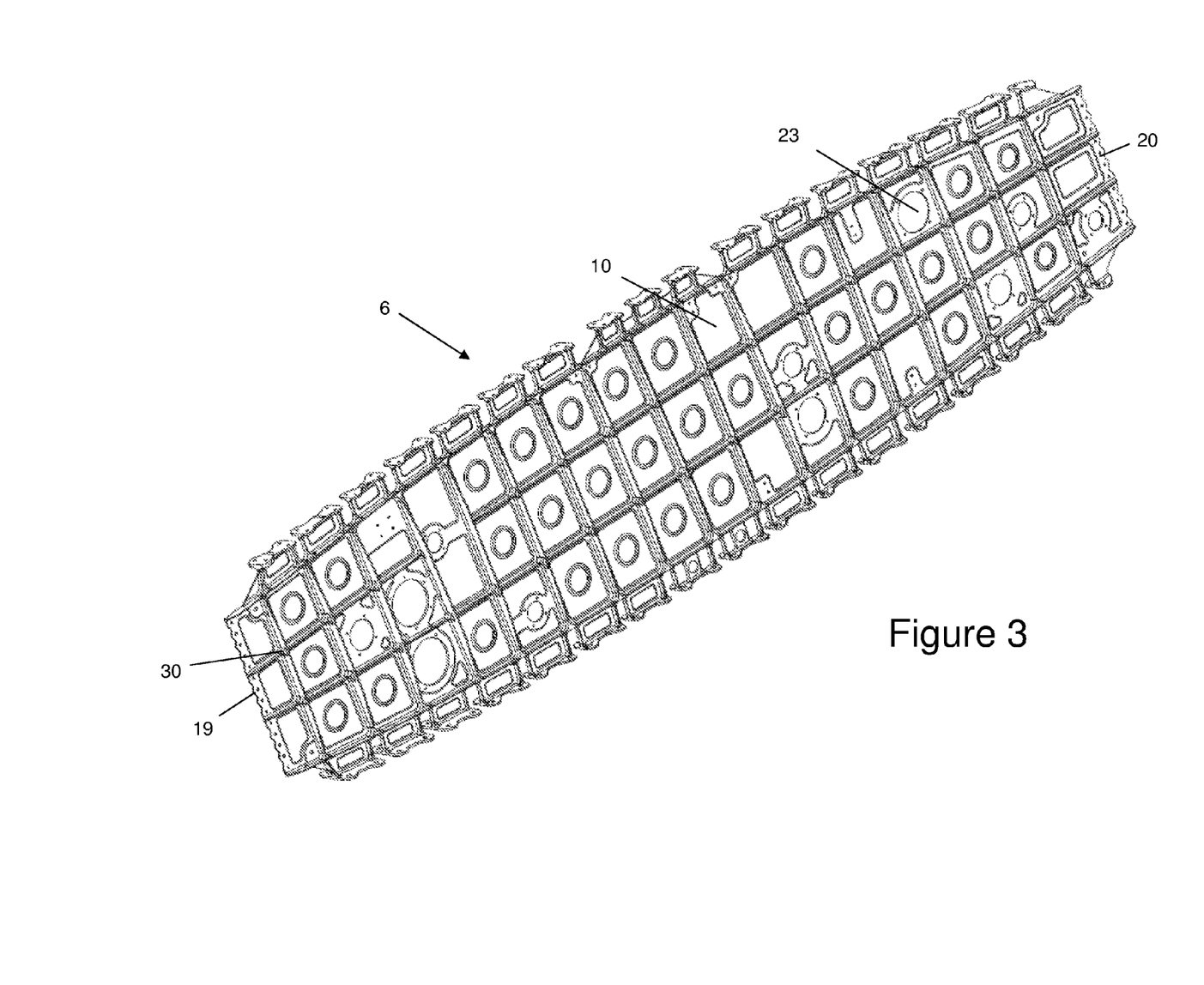
Figure 4:
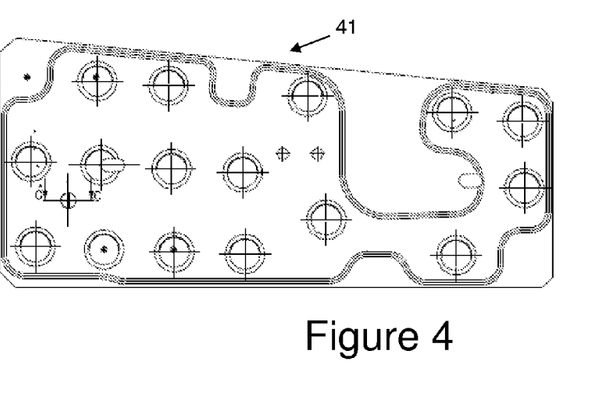
FIG. 4 shows the internal (suction) faces of a pair of stiffeners.
Figure 5:
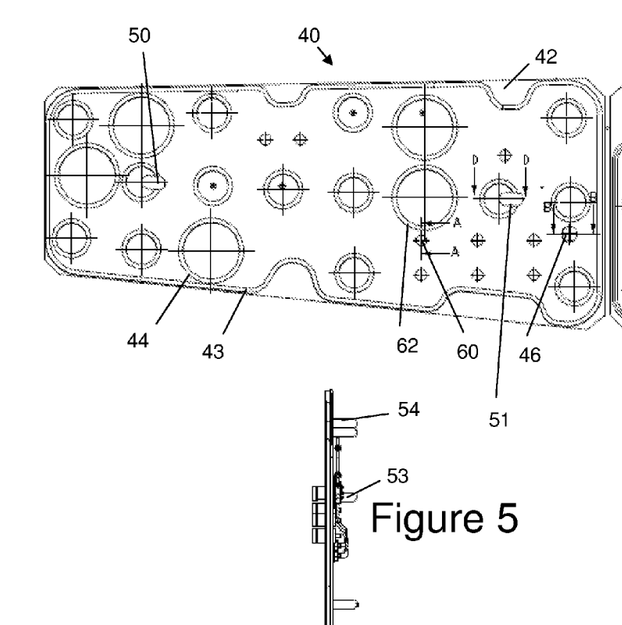
FIGS. 5 and 6 are front and side views of the stiffeners.
Figure 6:
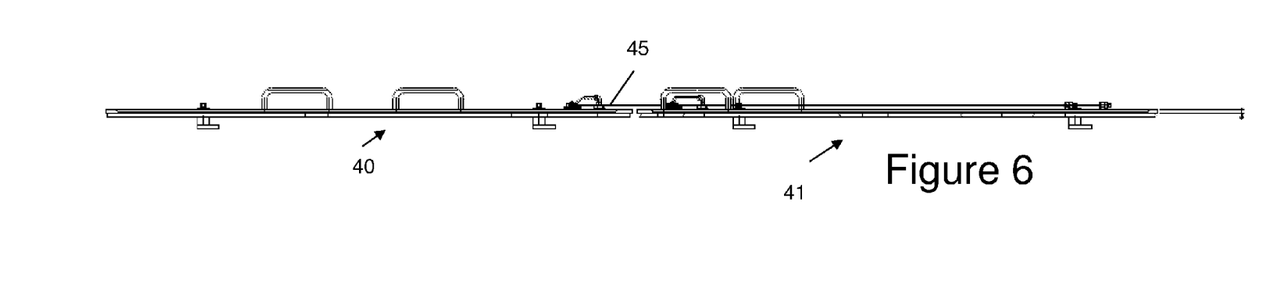

FIG. 1 is a schematic view showing part of an aircraft wing box 1 with upper and lower covers 2, 3 extending between front and rear spars 4, 5. A series of ribs 6-8 are attached to the upper and lower covers 2, 3 and to the spars 4, 5. An exemplary one of the ribs 6 is shown in FIGS. 2 and 3.

The rib 6 comprises a planar rib web 10 with a series of upper rib feet 11 extending from an upper edge of the rib web and a series of lower rib feet 12 extending from a lower edge of the rib web.

Mouse holes 13 are formed between each adjacent pair of upper rib feet 11 and each adjacent pair of lower rib feet 12. The upper and lower covers 2, 3 carry stringers (not shown) on their inner faces which run in a span-wise direction along the wing and each stringer passes through a respective mouse hole 13.

Each rib foot comprises flanges 14-17 extending span-wise (approximately horizontally) at an angle out of the vertical plane of the rib web, each flange having a respective bolt hole 18. The angle of the flanges 14-17 depends on the amount of taper in the wing between the upper and lower covers 2, 3, but in general is between 89° and 91°.

During assembly of the wing box 1, the flanges 14-17 are bolted to the upper and lower covers 2, 3 by approximately vertical bolts (not shown) passing through the bolt holes 18. The spars 4,5 carry rib posts (not shown) and the forward and aft ends 19, 20 of the rib are bolted to the rib posts by bolts (not shown) passing in a span-wise direction through bolt holes 21.

The web 10 has a flat face shown in FIG. 2 and a profiled face shown in FIG. 3. The flat face is substantially flat whilst the profiled face carries a framework of stiffeners 30.

Fuel is stored between adjacent ribs in the wing box 1. The rib web 10 has holes for allowing fuel and system cables to pass through the rib. The holes also serve to reduce the weight of the rib. An exemplary one of these holes is indicated at 23 in FIGS. 2 and 3. Fuel can also flow through the mouse holes 13.

The rib 6 is typically made of aluminium, or an aluminium/composite hybrid material. Without any supporting structure the rib 6 would bend under its own weight, particularly along its long axis. Therefore a pair of stiffeners 40, 41 shown in FIGS. 4-8 are provided to stiffen the rib during assembly of the wing box and minimize such bending. Alternatively if the rib is smaller then only a single stiffener may be needed.

The stiffeners are formed substantially from a composite material such as fibre-reinforced epoxy resin. This material is stiff but sufficiently light to enable the panels to be lifted manually by a single operator.

The stiffeners 40, 41 are attached to the flat face of the rib web by a vacuum clamping force as will be explained in more detail below. The stiffeners 40, 41 are substantially stiffer than the rib web 10 and together cover a majority of its surface area. Specifically, the stiffeners are designed to have a stiffness along their long axis which is of the order of ten times greater than the stiffness of the rib 6 along its long axis.

The stiffeners 40, 41 are similar and so only stiffener 40 will be described in detail. The stiffener 40 comprises a panel 42 with an internal (suction) face shown in FIG. 4 and an external face shown in FIGS. 7-9. A rubber external seal ring 43 is mounted on the internal face of the panel and defines a closed external perimeter of a vacuum cavity. Nineteen rubber internal seal rings are mounted on the panel within the perimeter defined by the external seal ring 43. An exemplary one of these internal sealing rings is indicated at 44 Each internal seal ring forms an internal perimeter of the vacuum cavity and is aligned with a respective hole on the rib 6. Thus when the stiffener 40 is attached to the rib 6, each internal seal ring seals off a respective rib hole. For instance the internal sealing ring 44 seals off the hole 23.

Figure 12:
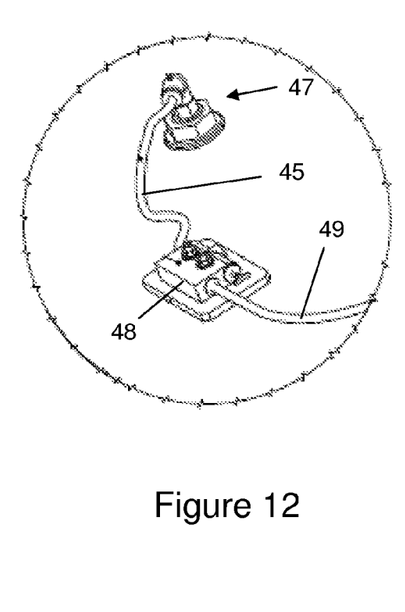
FIG. 12 is a perspective view of a vacuum fitting and vacuum generator.
Figure 13:
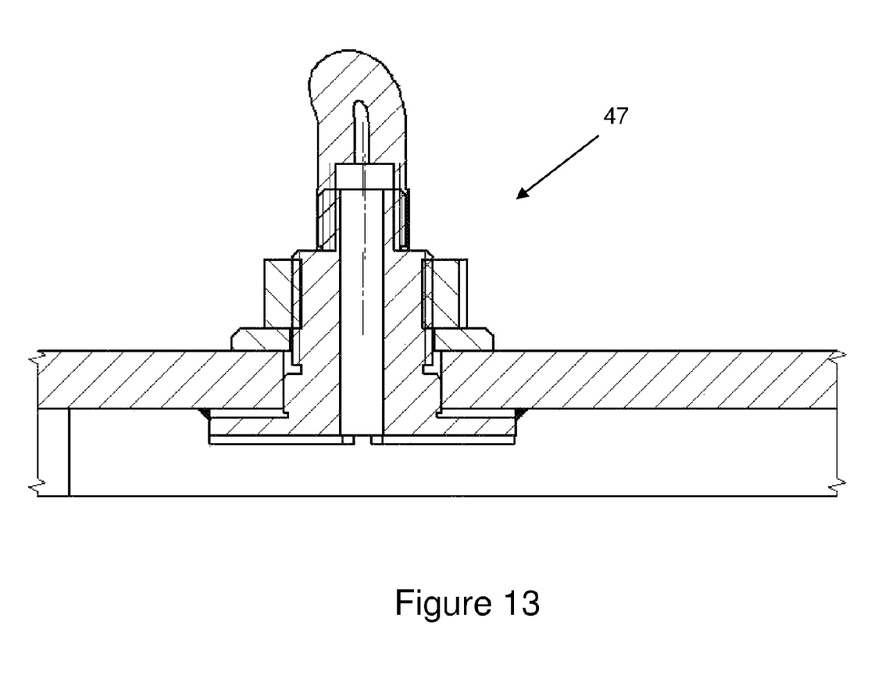
FIG. 13 is a cross-sectional view of the vacuum fitting taken along a line B-B indicated in FIG. 4.

A vacuum line 45 is coupled to a vacuum port in the panel of the stiffener by a fitting 47 shown in cross-section in FIGS. 12 and 13. A vacuum generator 48 receives a flow of air from an input line 49, and generates a vacuum in the vacuum line 45 by the Venturi effect.

Figure 10:
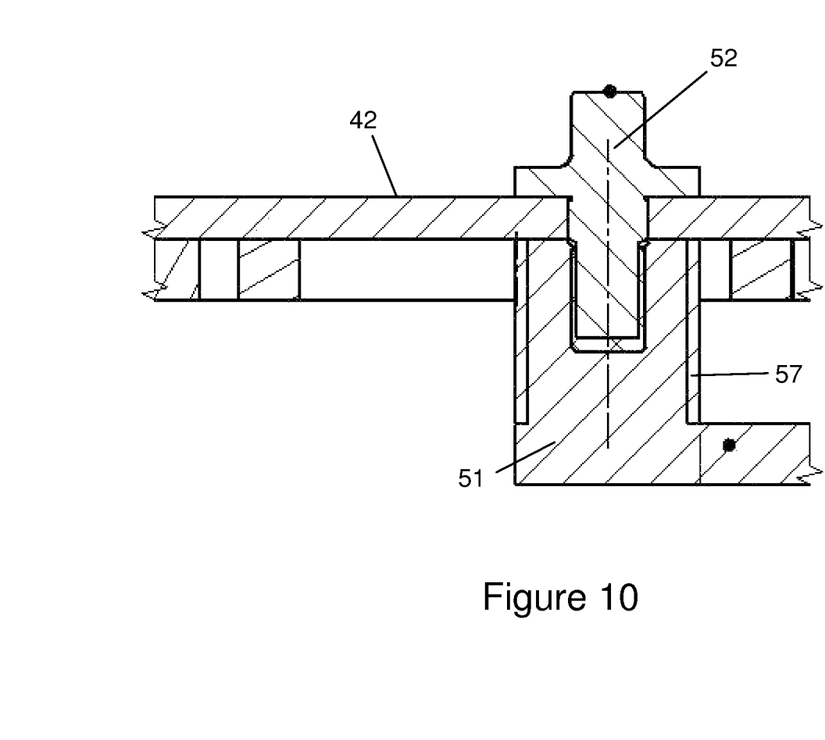
FIG. 10 is a cross-sectional view of a location hook taken along line a D-D indicated in FIG. 4.

A pair of location hooks 50, 51 extend from the internal face of the stiffener 40 for accurately positioning and supporting the stiffener on the rib. As shown in FIG. 10 the hook 51 is connected to the stiffener panel 42 with a fastener 52 and has a nylon protective sleeve 57.

Figures 7, 8:
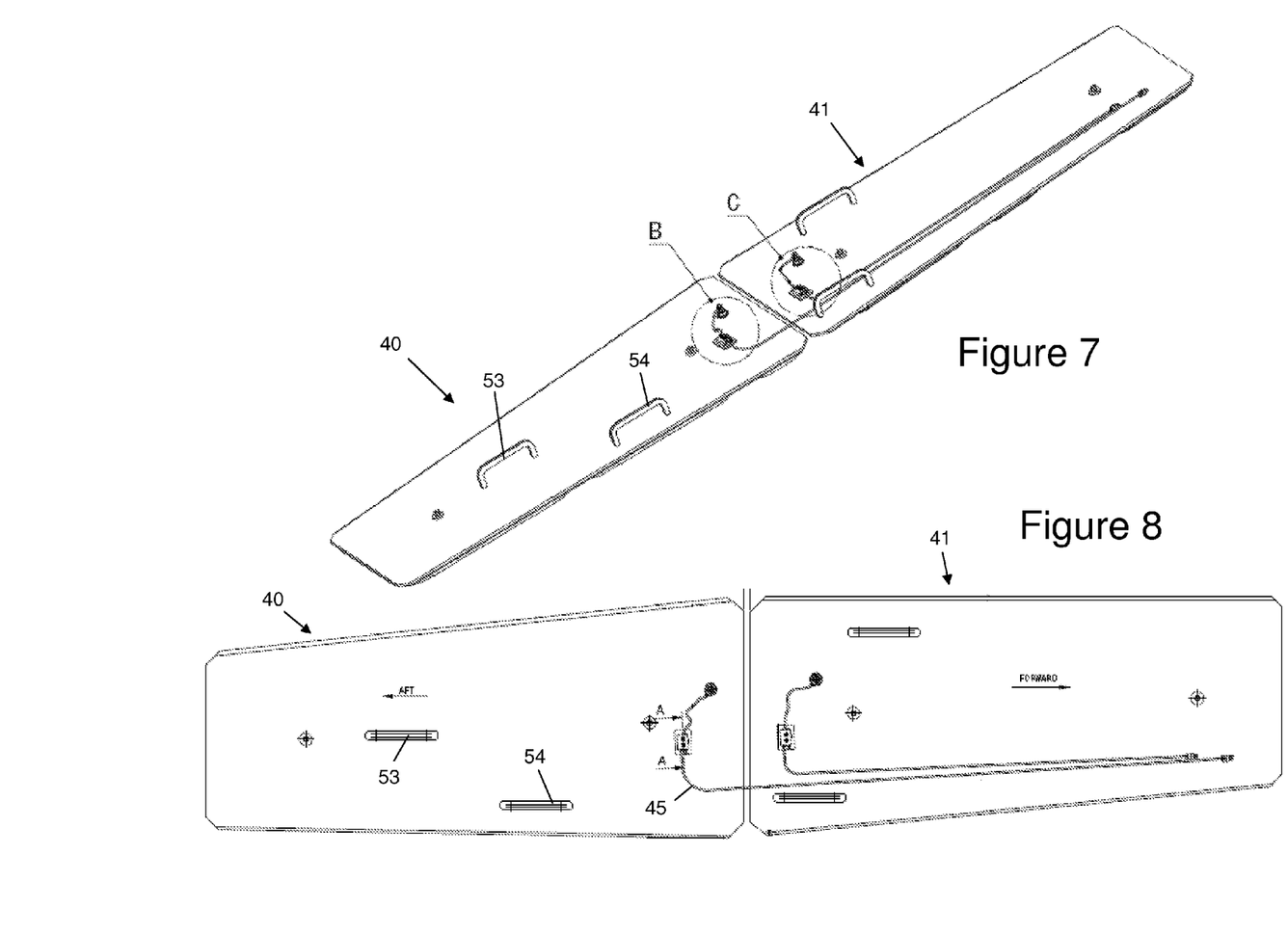
FIGS. 7 and 8 show the external faces of the stiffeners.

Referring to FIGS. 7 and 8, the external face of the stiffener 40 further comprises a pair of handles 53 and 54. The stiffeners are mounted to the rib with the rib oriented vertically and its forward edge 19 at the bottom. The stiffener 40 is lifted by an operator using handles 53, 54 into the proximity of the rib 6, the location hooks 50, 51 are inserted into the corresponding holes 55, 56 in the rib 6 and the stiffener is allowed to move down slightly so that the nylon protective sleeves 57 on the shafts of the two location hooks 50, 51 engage the lower edges of the holes. At this point the operator lets go of the handles and the shafts of the hooks take the weight of the stiffener. The end portions of the hooks prevent the stiffener from falling away from the rib.

Next the vacuum generator is turned on and partially evacuates the vacuum chamber defined by the stiffener panel, the internal and external sealing rings, and the rib web. This sucks the stiffener towards the rib, compressing the seals.

Figure 11:
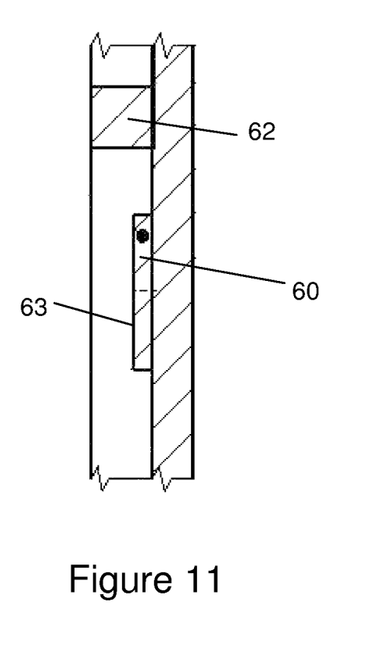
FIG. 11 is a cross-sectional view of a stand-off disk taken along a line A-A indicated in FIG. 4.

A minimum gap between the stiffener panel and rib web is maintained by nine stand-off disks 60 which extend from the internal face of the panel 42. FIG. 11 shows a cross-section of one of the stand-off disks 60 as viewed along a line A-A in FIG. 4 with the sealing ring 62 uncompressed. In its uncompressed state the sealing ring 62 is thicker than the stand-off disk 60. However, when the stiffener 40 is attached to the rib 6, the sealing ring 62 compresses against flat face 21 and its thickness reduces until the rib web engages the stand-off disks 60. The thickness of the stand-off disks 60 is selected to match the thickness of the sealing ring 62 in its compressed state. As well as maintaining a minimum gap, the stand-off disks also prevent local bending of the rib or stiffener under vacuum load.

Figure 9:
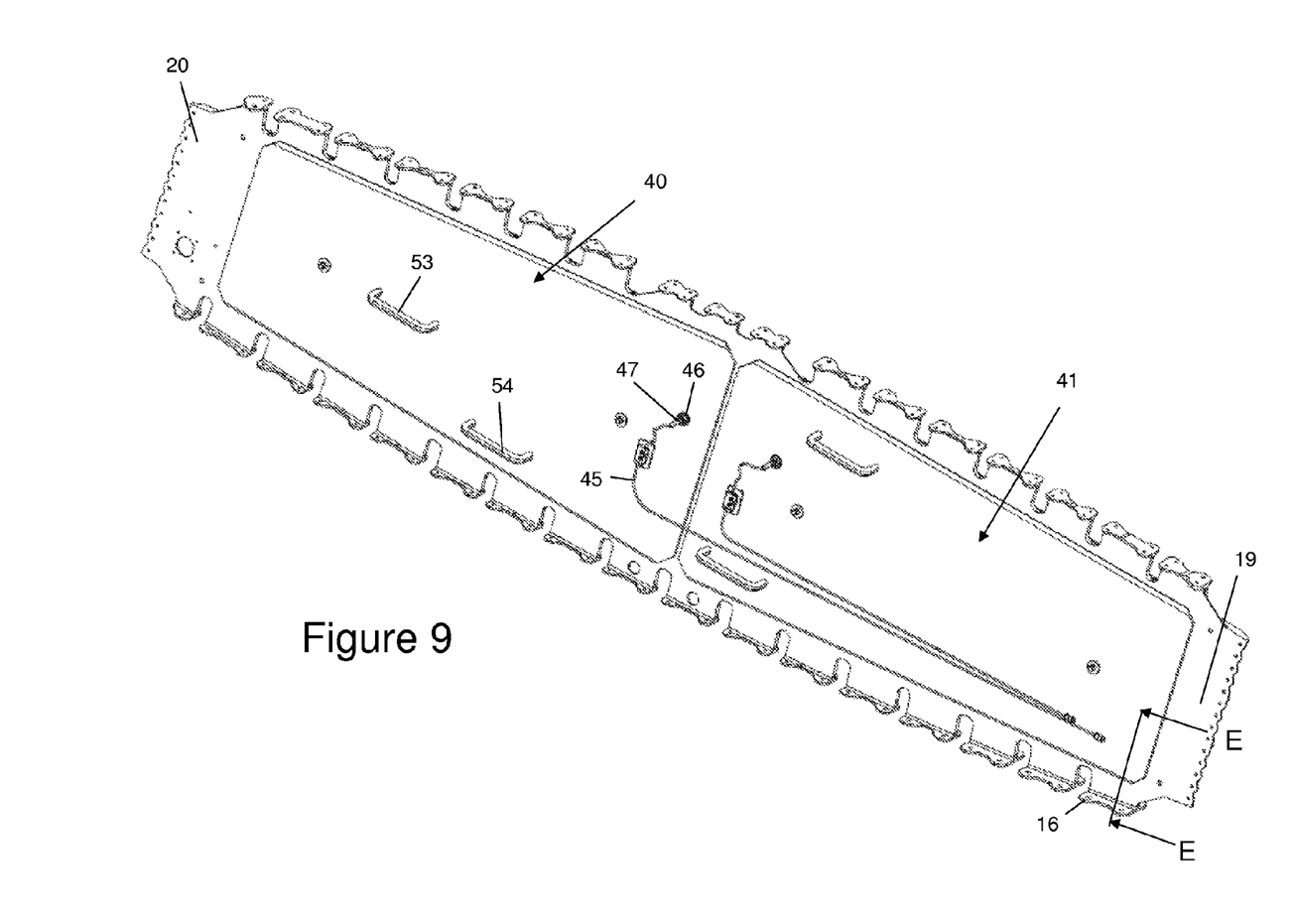
FIG. 9 is a perspective view of one of the ribs with the stiffeners attached.
Figure 14:
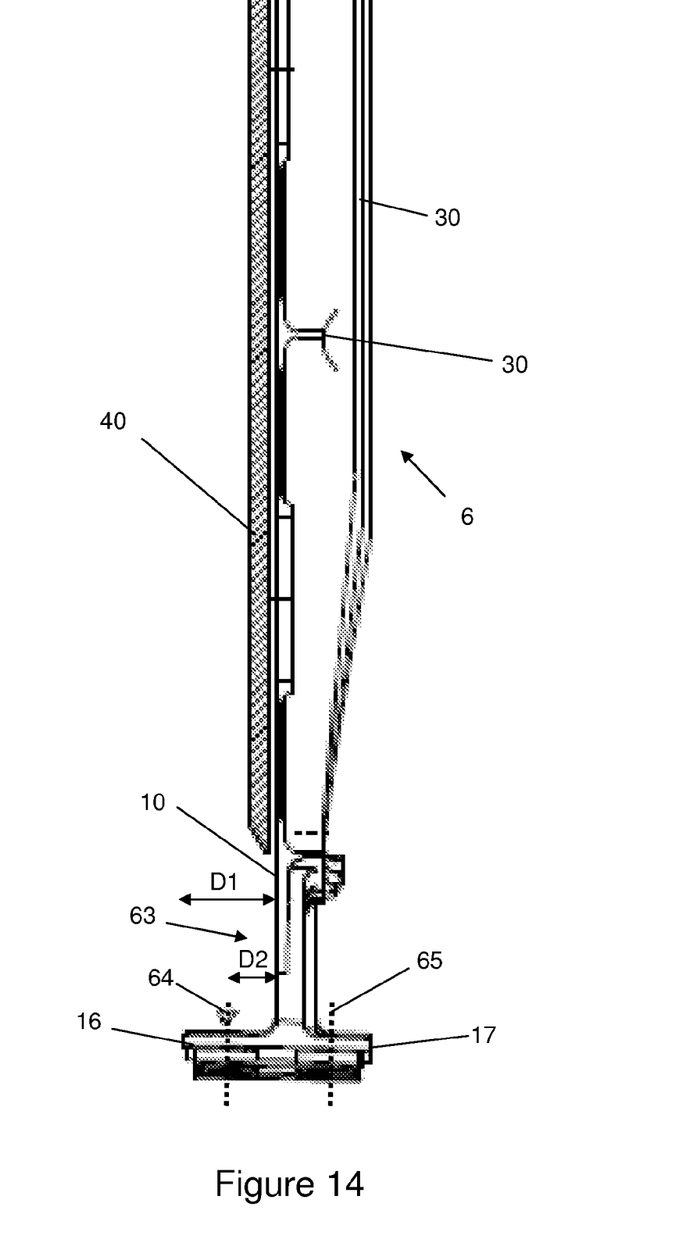
FIG. 14 is a cross sectional view of a lower part of the rib with the stiffener attached, taken along a line E-E indicated in FIG. 9.

FIG. 14 shows a cross-section through a forward part of the rib 6, with the stiffener attached, taken along a line E-E indicated in FIG. 9. The rib 6 is attached to each cover by the following sequence of assembly operations.

1. The rib 6 is aligned with the cover with the stiffener panels attached. The rib and/or the cover may be moved during this assembly operation.
2. Bolt holes are drilled in the cover by passing a drill through the bolt holes 18 in the rib foot flanges. The stiffeners remain attached during this assembly operation to ensure that the rib does not bend out of shape and become misaligned with the cover.
3. The rib is attached to the cover by passing bolts through bolt holes 18 in the rib foot flanges and the drilled bolt holes in the cover. Optionally the stiffeners can remain in place during this assembly operation and then removed by turning the vacuum generators off to release the vacuum and lifting the stiffeners off by hand. Alternatively the stiffeners can be removed after the holes have been drilled but before the bolts are inserted. In the latter case, if the rib bends before the bolts are inserted then it can be manually moved back to realign the bolt holes. Once a few bolts have been inserted then the rib will be aligned and will not bend significantly.

FIG. 14 shows a pair of rib foot flanges 16, 17 and dotted lines 64, 65 representing the line of the bolts which extend substantially parallel with the rib web.

The stiffener 40 does not impede access to the bolt holes 18 during the drilling operation for two reasons:

1. The stiffener is relatively thin. Specially, the rib foot flanges 16 have distal ends remote from the rib web 10 which are spaced from the rib web by a distance D1 measured in a direction normal to the rib web. The bolt holes 18 in the rib foot flanges 16 are spaced from the rib web by a distance D2 measured in a direction normal to the rib web. The stiffener panel 40 has a maximum thickness measured in a direction normal to the rib web which is less than D1 and D2.

2. A small space 63 is provided between the bottom edge of the stiffener 40 and the rib foot flange 16.

Thus the stiffener 40 can remain attached to the rib 6 as the drill is passed through the bolt holes 18 to drill the holes in the covers 2, 3.

Although the invention has been described above with reference to one or more preferred embodiments, it will be appreciated that various changes or modifications may be made without departing from the scope of the invention as defined in the appended claims.

The invention claimed is:

1. A method of stiffening a rib during the assembly of an aircraft wing, the method comprising:
   a. attaching one or more stiffener panels to a face of the rib by the action of a partial vacuum;
   b. aligning the rib with a wing component with the stiffener panel(s) attached;
   c. performing an assembly operation with the rib aligned and the stiffener panel(s) attached; and
   d. removing the stiffener panel(s) from the rib after the assembly operation by releasing the partial vacuum.

2. The method of claim 1 wherein the assembly operation comprises drilling one or more fasteners holes in the rib and/or the wing component by passing a drill through the aligned rib and wing component.

3. The method of claim 2 wherein the rib comprises a rib web with a series of rib feet positioned at an edge of the rib web and extending at an angle to the rib web; and wherein the drill passes through the rib feet.

4. The method of claim 1 wherein the assembly operation comprises fastening the rib to the wing component.

5. The method of claim 1 wherein the rib comprises a rib web with a series of rib feet positioned at an edge of the rib web and extending at an angle to the rib web; and wherein the assembly operation comprises fastening the rib feet to the wing component.

6. The method of claim 1 wherein each stiffener panel comprises a resilient external sealing ring which is mounted on a face of the panel and forms an external perimeter of a vacuum cavity; and at least one resilient internal sealing ring which is mounted on the panel within the perimeter defined by the external sealing ring and forms an internal perimeter of the vacuum cavity, and wherein the stiffener panel is attached to the rib by forming a vacuum chamber by engaging the rib with the external sealing ring of the stiffener panel, the rib having one or more holes located within the perimeter defined by the external sealing ring; sealing each hole in the rib with a respective internal sealing ring; and creating a partial vacuum in the vacuum chamber to attach the stiffener panel to the rib.

7. The method of claim 1 wherein the stiffener panel(s) cover more than 50% of the area of the face of the rib.

8. An aircraft wing rib assembly comprising:
   a wing rib; and
   one or more stiffener panels attached to a face of the wing rib, wherein each stiffener panel has a resilient external sealing ring which is mounted on a face of the panel and forms an external perimeter of a vacuum cavity, and wherein each stiffener panel is adapted to be attached to the rib by creating a partial vacuum in a vacuum chamber formed by engaging the rib with the external sealing ring of the stiffener panel.

9. The assembly of claim 8 wherein the wing rib comprises a rib web with a series of rib feet positioned at an edge of the rib web and extending at an angle to the rib web.

10. The assembly of claim 8 wherein the stiffener panel(s) covers more than 50% of the area of the face of the rib web.

11. The assembly of claim 9 wherein the rib feet have distal ends remote from the rib web which are spaced from the rib web by a distance D measured in a direction normal to the rib web, and wherein each stiffener panel has a maximum thickness measured in a direction normal to the rib web which is less than D.

12. The assembly of claim 8 further comprising at least one resilient internal sealing ring which is mounted on the panel within the perimeter defined by the external sealing ring and forms an internal perimeter of the vacuum cavity, and wherein the rib has one or more holes located within the perimeter defined by the external sealing ring, each hole in the rib being sealed by a respective internal sealing ring.

13. The assembly of claim 8 wherein the panel is formed substantially from a composite material.

14. The assembly of claim 8 further comprising one or more spacers mounted on the face of the panel within the vacuum cavity for maintaining a gap between the face of the panel and the rib.

15. The assembly of claim 8 further comprising a series of locating members extending from the face of the panel for locating the stiffener panel on the rib.

16. A stiffener tool for stiffening a rib during the assembly of an aircraft wing, the stiffener tool comprising:
   a panel;
   a resilient external sealing ring which is mounted on a face of the panel and forms an external perimeter of a vacuum cavity;
   a plurality of resilient internal sealing rings, each internal sealing ring being mounted on the panel within the perimeter defined by the external sealing ring and forming an internal perimeter of the vacuum cavity; and
   a vacuum line coupled to a vacuum port in the panel of the stiffener tool.

* * * * *